United States Patent

Rohrbach et al.

[11] Patent Number: 5,951,744
[45] Date of Patent: Sep. 14, 1999

[54] MULTICOMPONENT DEPTH ODOR CONTROL FILTER AND METHOD OF MANUFACTURE

[75] Inventors: Ronald P. Rohrbach, Hunterdon, N.J.; Gordon W. Jones, Toledo, Ohio; Peter D. Unger, Convent Station, N.J.; Daniel E. Bause; Lixin Xue, both of Morristown, N.J.; Russell A. Dondero, N. Arlington, N.J.

[73] Assignee: AlliedSignal Inc., Morristown, N.J.

[21] Appl. No.: 08/963,920

[22] Filed: Nov. 4, 1997

Related U.S. Application Data

[63] Continuation-in-part of application No. 08/666,853, Jun. 19, 1996, Pat. No. 5,704,966, which is a continuation-in-part of application No. 08/363,500, Dec. 23, 1994, abandoned, which is a continuation-in-part of application No. 08/736,308, Oct. 24, 1996, Pat. No. 5,713,971, which is a continuation of application No. 08/363,500, Dec. 23, 1994, abandoned, which is a continuation of application No. 08/757,984, Nov. 27, 1996, Pat. No. 5,759,394.

[51] Int. Cl.⁶ .................................................. B01D 39/02
[52] U.S. Cl. .............................. 96/154; 55/524; 55/527; 55/DIG. 5; 95/211; 96/290; 96/296; 261/104; 261/107; 264/257; 264/271.1; 264/DIG. 48; 428/372; 428/398
[58] Field of Search .......................... 96/290, 294, 296, 96/181, 143, 144, 154, FOR 123, FOR 124; 428/397, 398, 362, 372; 264/241, 259, 273, 257, 271.1, 279, 279.1; 55/302, 303, 524, 521, DIG. 5, 527, 528; 261/80, 94, 99, 104, 107, DIG. 17, DIG. 65; 95/210–212, 159, 171, 170

[56] References Cited

U.S. PATENT DOCUMENTS

| | | | |
|---|---|---|---|
| 1,273,682 | 7/1918 | Slater et al. | 261/104 |
| 2,085,390 | 6/1937 | Quinlivan | 261/104 |
| 2,603,465 | 7/1952 | Sutton | 261/104 |
| 2,653,017 | 9/1953 | Frost | 261/104 |
| 3,505,175 | 4/1970 | Zalles | 261/80 X |
| 3,754,377 | 8/1973 | Clonts | 95/211 |
| 3,888,955 | 6/1975 | Maruko | 261/104 X |
| 3,991,724 | 11/1976 | Geiser | 261/99 X |
| 4,031,180 | 6/1977 | Bohanon | 261/106 |
| 4,086,305 | 4/1978 | Dobritz | 261/104 X |
| 4,098,852 | 7/1978 | Christen et al. | 261/104 |
| 4,102,656 | 7/1978 | Koritz | 261/107 X |

(List continued on next page.)

FOREIGN PATENT DOCUMENTS

0600331 A1  6/1994  European Pat. Off. .

OTHER PUBLICATIONS

References Cited In Parent Case U.S. application No. 08/736,308.

*Primary Examiner*—Richard L. Chiesa

[57] ABSTRACT

A unique filtration device (10) which continuously removes gas phase contaminants from an air stream through the use of partially hollow wicking fibers (20) impregnated with a fine solid carbon powder (18) or zeolites and formed into a fiber filter (12) with a selected chemisorptive liquid applied to one side of the fiber filter (12) and large carbon particles (19) applied to the other side of the fiber filter (12). The air stream to be cleaned is directed through filter element (12) which can capture the gas phase contaminants. The wicking fibers (20) include internal longitudinal cavities (22) filled with the fine carbon powder (18) and each having a relatively small longitudinal extending opening (24). The wicking fibers (20), to a shallow depth on one side of filter (12), are filled with the selected contaminant removing chemisorptive liquid through capillary action by which the individual wicking fibers (20) rapidly draw the selected chemisorptive liquid, with which they come into contact, through the internal cavities (22). The chemisorptive liquid and fine carbon powder (18) or zeolite powder remain within the wicking fiber cavities (22) and generally do not enter the space between the wicking fibers yet through the longitudinal openings (24) the fine carbon particles (18) and the chemisorptive liquid are in full fluid communication with the air stream flowing past the fibers (20).

23 Claims, 5 Drawing Sheets

U.S. PATENT DOCUMENTS

| | | | |
|---|---|---|---|
| 4,130,487 | 12/1978 | Hunter et al. | 55/521 X |
| 4,166,087 | 8/1979 | Cline et al. | 261/DIG. 17 |
| 4,300,925 | 11/1981 | Nikandrov et al. | 96/130 |
| 4,323,373 | 4/1982 | Fritz | 95/281 |
| 4,534,775 | 8/1985 | Frazier | 96/154 X |
| 4,578,091 | 3/1986 | Borja | 95/214 |
| 4,774,032 | 9/1988 | Coates et al. | 261/104 |
| 4,938,787 | 7/1990 | Simmeriein-Erlbacher | 96/298 |
| 4,976,113 | 12/1990 | Gershuni et al. | 261/104 X |
| 5,024,686 | 6/1991 | Lerner | 96/361 |
| 5,057,368 | 10/1991 | Largman et al. | 428/397 |
| 5,110,325 | 5/1992 | Lerner | 95/213 |
| 5,310,416 | 5/1994 | Borger et al. | 95/64 |
| 5,318,731 | 6/1994 | Yokoya et al. | 261/104 |
| 5,472,613 | 12/1995 | Schofield | 210/634 |
| 5,486,410 | 1/1996 | Groeger et al. | 96/154 X |
| 5,603,753 | 2/1997 | Krull et al. | 96/154 X |
| 5,704,966 | 1/1998 | Rohrbach et al. | 95/170 |
| 5,713,971 | 2/1998 | Rohrbach et al. | 261/104 X |
| 5,759,394 | 6/1998 | Rohrbach et al. | 55/527 X |

MULTICOMPONENT DEPTH ODOR CONTROL FILTER AND METHOD OF MANUFACTURE

This is a continuation-in-part of U.S. patent applications Ser. No. 08/666,853, filed on Jun. 19, 1996, now U.S. Pat. No. 5,704,966, which is a continuation-in-part of Ser. No. 08/363,500, filed on Dec. 23, 1994, now abandoned; Ser. No. 08/736,308, filed on Oct. 24, 1996, now U.S. Pat. No. 5,713,971, which is a continuation of Ser. No. 08/363,500, filed on Dec. 23, 1994, now abandoned and Ser. No. 08/757,984, filed on Nov. 27, 1996, now U.S. Pat. No. 5,759,394.

BACKGROUND OF THE INVENTION

1. Field of the Invention

This invention relates to an air cleaning system and more particularly to an odor removal system using wicking fibers incorporating large carbon particles, a dry fine solid carbon powder and chemisorptive reagents.

2. Description of Prior Art

Conventional carbon adsorbents have a broad range of effectiveness against odors. However, such activated carbon adsorptive techniques of removing odor from an air stream are effective only for a relatively short time period, are relatively inefficient at low odor concentration levels, and frequently result in a relatively high pressure differential across the activated carbon filter element. As a result relatively large quantities of activated carbon are required in such filter devices, however, even with the larger amount of activated carbon the relatively large pressure differential problem will still remain. These prior devices are usually operated mechanical on a cyclic bases. An example of an adsorptive technique for the removal of odors is the use of activated charcoal as an odor removing element in a device to purify an air stream. U.S. Pat. No. 4,130,487 shows a filter for liquid or gases which includes activated carbon for removing odors during air filtration. The activated carbon is in an additional layer which is added to the filter material.

In the prior art fibers have had surface coatings ranging from finely divided powder particles to coarse granular particles. The particles have been applied by either an adhesive coating which mechanically retains the particles on the fiber or the powder particles have been embedded on the fiber surface during the tacky stage in the polymer processing. The carbon fiber can also be formed by heating polymer fibers and attaching carbon particles when the polymer is sticky or by using an adhesive to hold the carbon particles to a fiber. The ability to coat various powdered particulate material on a surface of a fiber has generally required an adhesive layer to be used to immobilize and hold the powder particles on the fiber surface. The very act of using an adhesive layer to hold the particles results in a portion of the surface of the powder particles being contaminated by the adhesive and therefore becoming ineffective for applications such as filtration. A balance has to be met between the strength of the immobilization versus the maintaining of effectiveness of the powder layer.

In order to minimize this contamination typically larger particles are often used so that the point of contact between the surface adhesive and powder particles is small. In typical gaseous applications using activated carbon the particles used are most frequently 100 microns and larger; and, finely powdered activated carbon is basically only used in liquid decolorization applications despite the fact that fine powder activated carbon holds the potential of much more rapid kinetics.

It is desirable to provide a compact, economical air filter for the continuous removal of odors which avoids the problems of reduced flow rates, a relatively high pressure differential across the activated carbon filter, and reduced removal efficiency over time.

SUMMARY OF THE INVENTION

The present invention provides a unique filtration device which continuously removes odor contaminants from an air stream through the use of a wicking fiber filter mat containing in its channels a very fine solid carbon powder with a large particle granular carbon layer attached to the inlet side of the mat and a selected chemisorptive reagent package sprayed onto the backside of the mat. The chemical impregnate spray only penetrates a short distance into the wicking fiber filter mat. This filter has different filtering zones at different depth through the filter. The different zones are effective in removing different gas phase contaminates. We have found this yields a filter which is kinetically very efficient, has a long life and is very effective at removing a wide range of odors. The basic liquid chemisorptive agent can contain zinc acetate-potassium hydroxide. Alternatively, the liquid chemisorptive agent can contain sodium permanganate in combination with sodium carbonate or sodium phosphate into which other reagents can be added for additional odor removal capabilities.

Wicking fibers such as those disclosed in U.S. Pat. No. 5,057,368 are very small and well suited to the practice of the present invention. These generally hollow wicking fibers include internal longitudinal cavities each with a longitudinal opening extending to the outer fiber surface. The fiber, the opening size and the particles to be entrapped are selected so that when the particles are forced into the longitudinal cavities they are permanently retained. The fibers selected provide a way to mechanically immobilize a fine powder. The small solid particles become mechanically trapped within the longitudinal cavities of the fibers and are basically irreversible bound. This approach can be extended to any powder which one would like to entrap within a fiber medium, including such agents as carbon, zeolites, baking soda, cyclodextrins, PTFE, or any number of other solid particle of interest. After the very fine solid particles are entrapped the wicking fiber mat has a large particle granular carbon layer glued onto its front side and a shallow layer on the backside of the wicking fiber mat is impregnated with a liquid chemisorptive agent. We have found that incorporating a number of different adsorbent/absorbent zones via the wicking fiber mat yields a very effective filter Wicking fibers have the ability to carry a liquid along their surface and to retain the liquid so it is not easily dislodged. Through capillary action the individual wicking fibers rapidly draw the selected liquid, with which it comes into contact, through the internal cavities. The chemisorptive liquid which is sprayed onto the back side of the wicking fiber filter mat, like the fine carbon particles, remains within the wicking fiber cavities and generally does not enter the space between the wicking fibers yet through the longitudinal openings the fine carbon particles and the liquid chemical reagent are in communication with the air stream flowing past the wicking fibers.

This invention can be use in a customized fashion to remove specific odors and toxic gases. In the disclosed device the open space between the wicking fibers remain so that, in the air stream to be cleaned, the pressure differential problem is minimized and air flow restrictions are not increased by continuous use of the fine particles and the liquid chemical reagent package. A device according to the present invention provides for nonmechanical and continuous noncyclic regeneration or cleaning of a gas stream.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
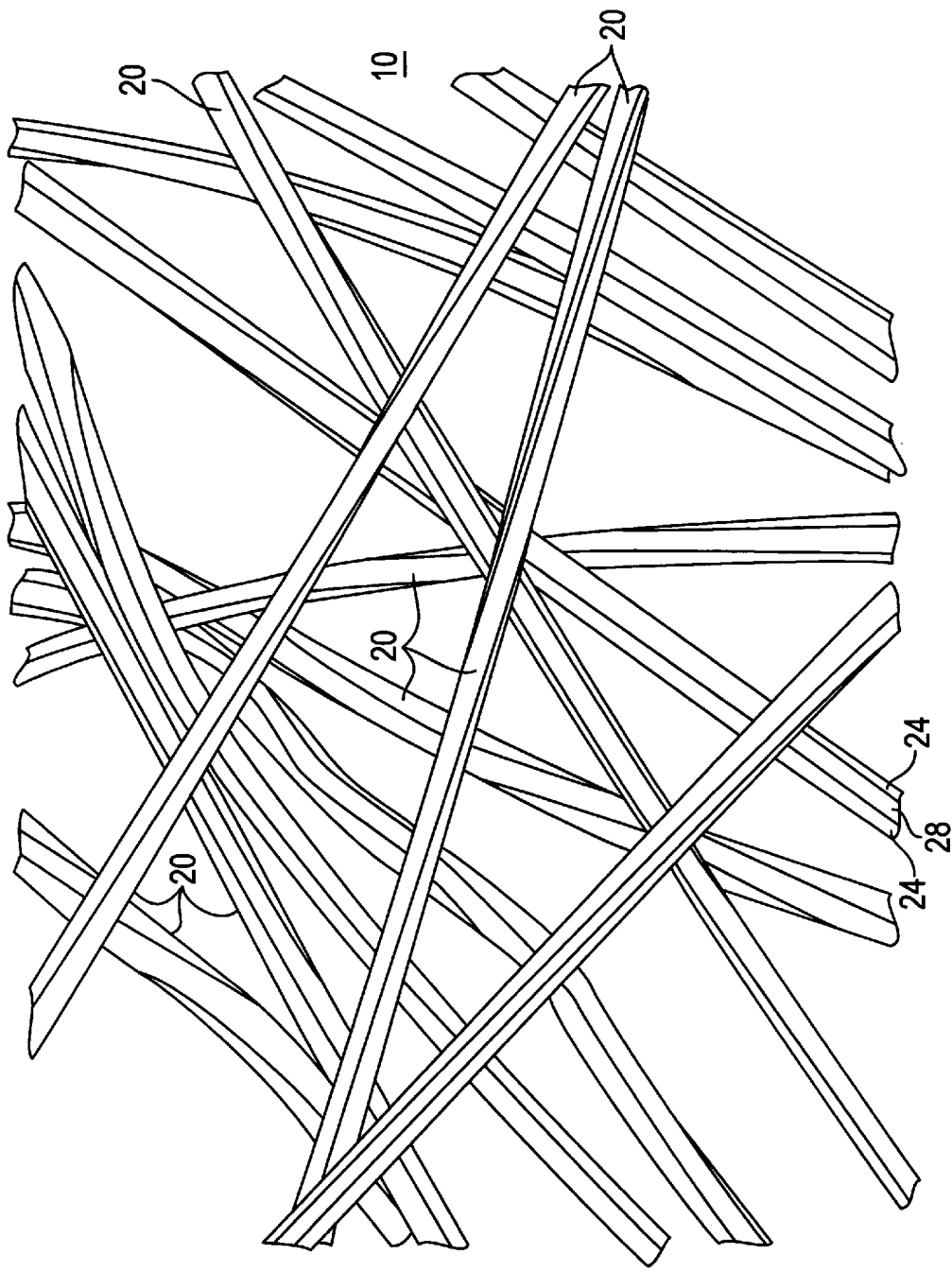
FIG. 1 is an illustration of a portion of a nonwoven fiber mat utilizing wicking fibers which can be impregnated with fine powder particles and a liquid chemisorptive agent according to the present invention.
Figure 2:
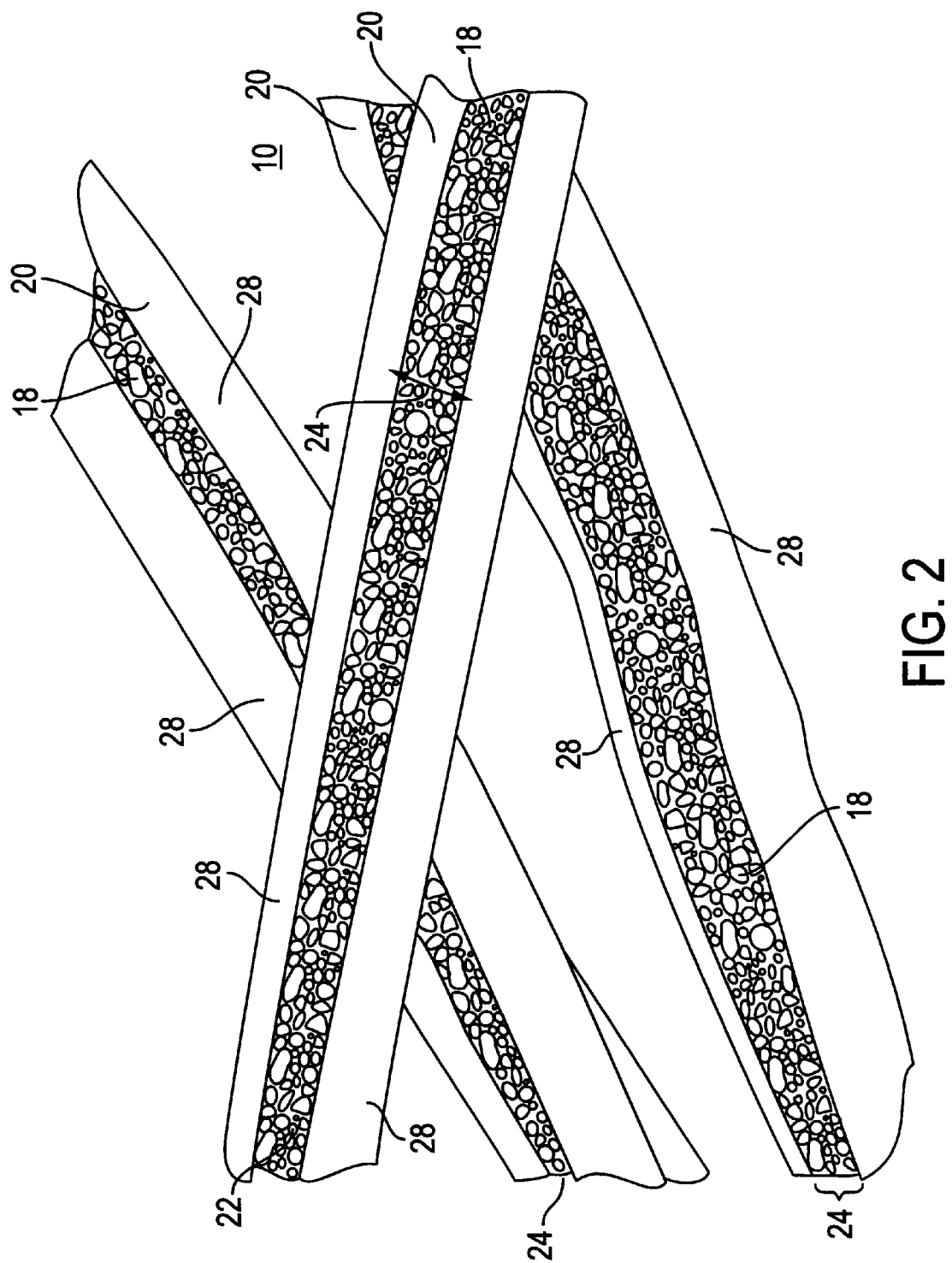
FIG. 2 is an enlarged view of a portion of the fiber mat shown in FIG. 1 utilizing wicking fibers containing the fine powder particles according to the present invention.

Referring now to the drawings and FIGS. 1 and 2 in particular there is shown a fiber mat 10 formed from a plurality of flexible fibers 20. The flexible fibers 20 are formed into the nonwoven fiber mat 10 which can be used as a filter. Each fiber 20 includes an internal cavity 22 within which are disposed small dry active carbon particles 18. A longitudinal opening 24 extends from each cavity 22 to the surface of each fiber 20. The multilobal fibers 20 are relatively small having a diameter of 250 microns to 10 microns or smaller. The fibers shown in FIGS. 1 and 2 are approximately 30 microns in diameter. The size of opening 24 is selected so when particles 18 are disposed in cavity 22 they are generally permanently entrapped and cannot easily be removed. The active carbon particles 18 are very small generally being less than 3 microns across.

The small carbon particles 18 become mechanically entrapped and remain within the fiber cavities 22 and generally do not enter the space between the fibers 20; yet, through the longitudinal openings 24 the particles 18 are in communication with the fluid or air stream flowing past the generally hollow fibers 20 during a filtering application.

In an odor removal use, the gas adsorbing active carbon particles 18 which have an affinity for the undesired gases to be removed from the air stream are selected and disposed within the internal channels or cavities 22 formed in the individual generally hollow fibers 20. The particles selected use adsorption rather than absorption as the mechanism to decontaminate or remove odor from the air stream. The particles 18 used are selected to adsorb the vapors of interest, to be non hazardous and to neutralize or remove specific gases and odor vapors.

Figure 4:
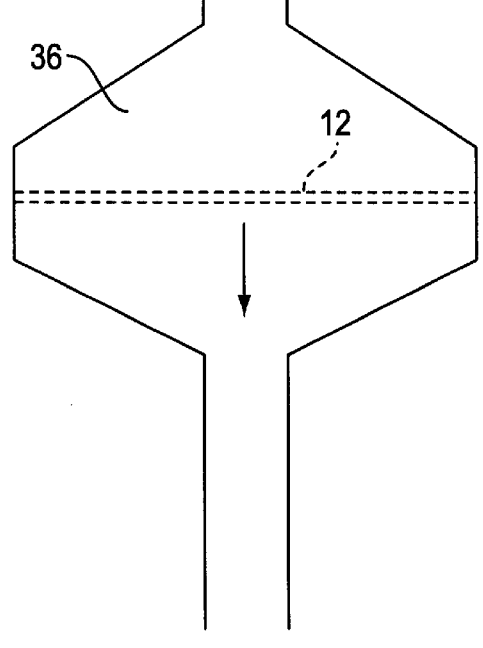
FIG. 4 is an illustration of an odor control filter system using a fiber mat, as shown in FIGS. 1 and 2, impregnated with the fine powder carbon particles and having large granular carbon particles on the front side and being impregnated with a liquid chemisorptive agent on its back side.

Referring now to FIG. 4 there is shown a diagrammatic illustration of odor removal device 30 according to the present invention. Device 30 includes a filter 12 formed of fibers 20 with fine carbon powder particles 10 and with an odor extracting liquid. The disclosed odor removal system 30 includes an odor removal chamber 36. The fiber mesh or filter element 12 consists of numerous wicking fibers 20 disposed and oriented to extend across chambers 36. The odor contaminated air stream to be cleaned enters chamber 36 and is directed through the impregnated fiber mesh 12 which is disposed across chamber 36. All of the odor contaminated air stream through chamber 36 must flow through the wicking fiber mesh filter 12. Fiber filter 12 is constructed with many wicking fibers 20 impregnated with the fine carbon powder 18 and having a thin chemisorptive odor extracting liquid layer on one side. Filter 12 has sufficient thickness so that the entire air stream flowing through chamber 36 comes into intimate contact with the fine carbon particles 18 and the selected chemisorptive liquid within the cavities 22 of the wicking fibers 20. The fine carbon powder 18 and chemisorptive liquid which have an affinity for the undesired odor molecules adsorb or absorb the odor molecules and thus remove them from the contaminated air stream flowing through chamber 36. Filter 12 can be changed periodically before it starts to become ineffective in odor removal.

Figure 5:
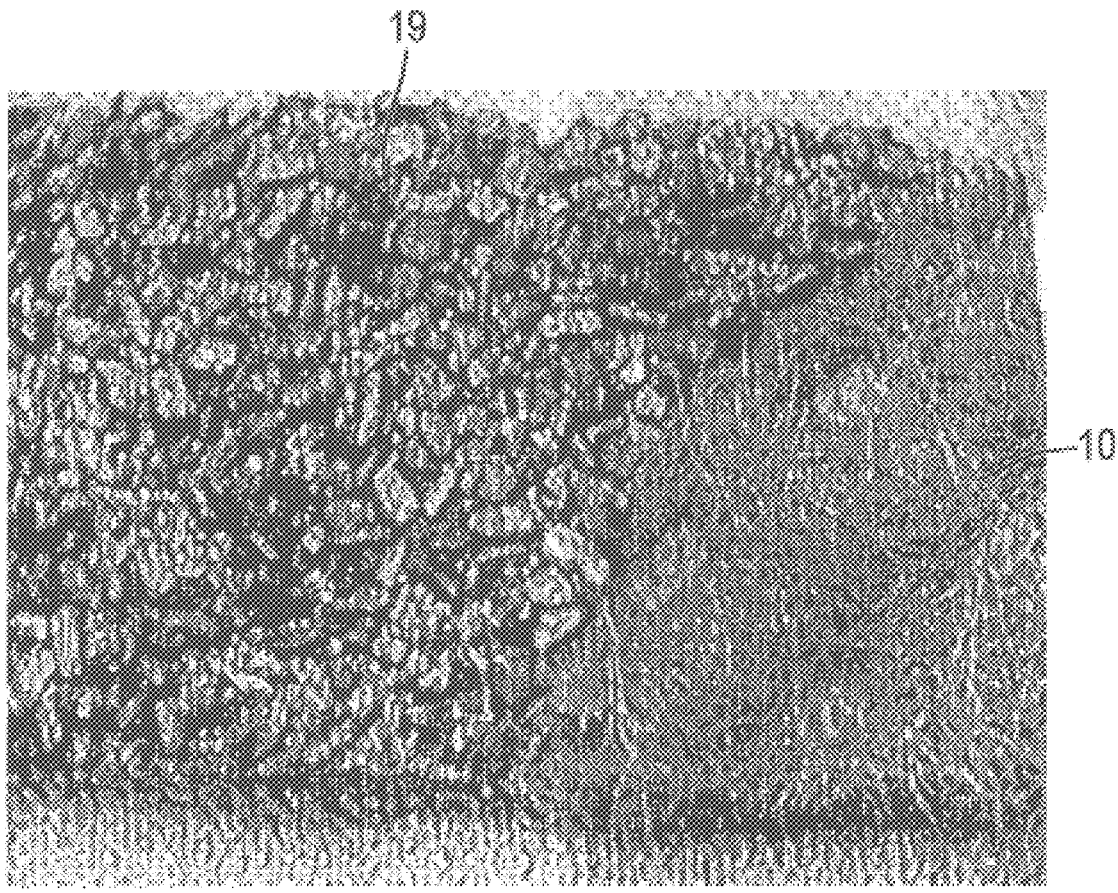
FIG. 5 is a side view of a portion of the wicking fiber filter mat, as shown in FIGS. 1 and 2, showing the large granular carbon particles attached to its front side; and, FIG. 6 is a diagrammatic view showing where the adsorbent/absorbent zones are applied to the wicking fiber filter mat.
Figure 6:
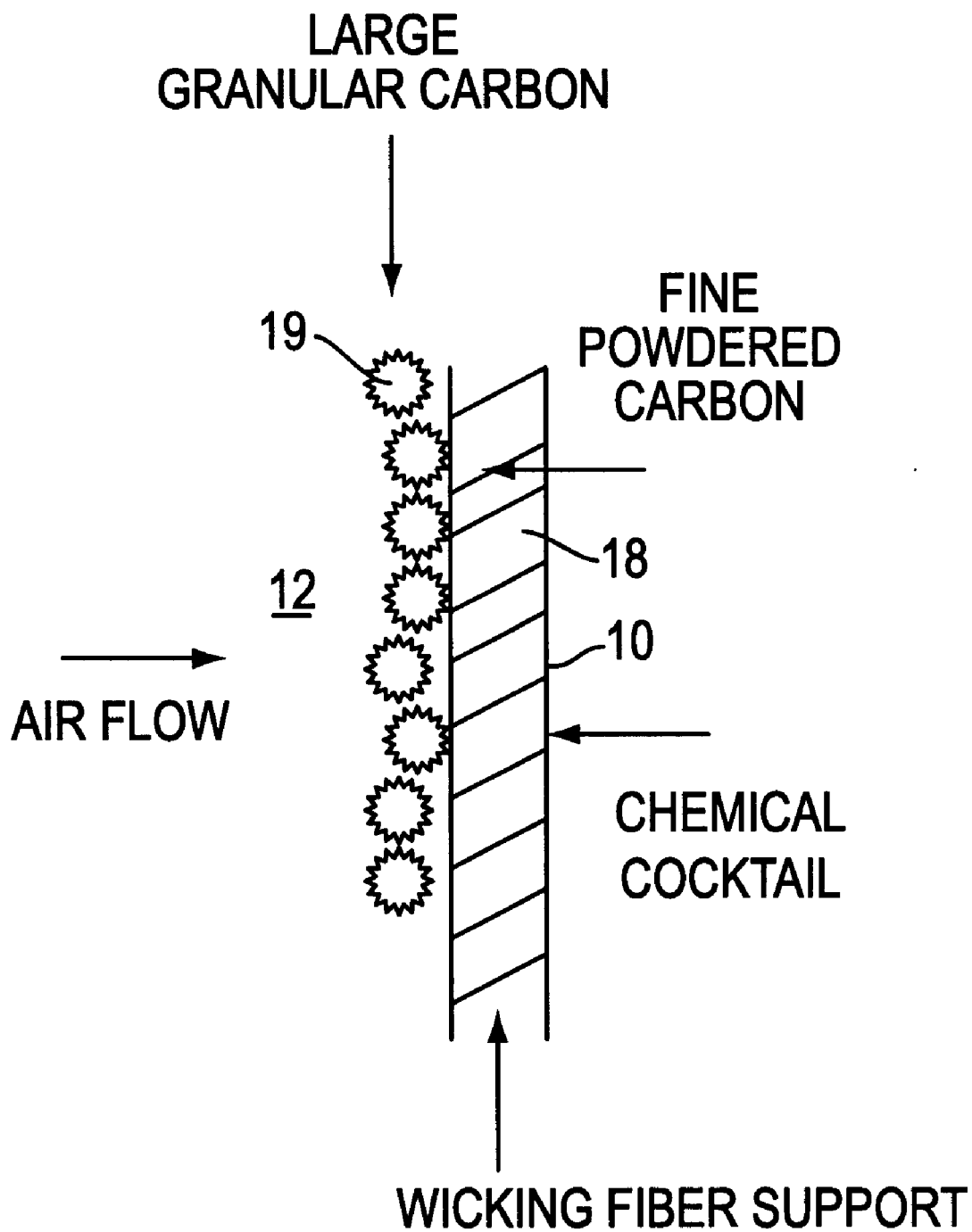

Referring now to FIG. 5 there is shown an illustration of a portion of a fiber filter mat 10 which is used in a tri-component depth odor control filter 12 as shown in FIG. 6. Large granular carbon particles 19 are attached to the front or inlet side of the fiber filter mat 10. The wicking fibers 20 in fiber filter mat 10 are impregnated with a fine carbon particles 18. A chemical reagent is applied to thin layer on the back or outlet side of fiber filter mat 10. This liquid chemical reagent is held in the back side wicking fiber 20 channels 22 with the small carbon particles 18. The basic liquid chemisorptive agent can contain zinc acetate-potassium hydroxide. Alternatively, the liquid chemisorptive agent can contain sodium permanganate in combination with sodium carbonate or sodium phosphate into which other reagents can be added for additional odor removal capabilities. The filter 12 thus has different adsorption and absorption zones for the removal of odors.

The granular carbon prebed formed by particles 19 on the front side of the fiber filter mat 10 protects the wicking fiber adsorption bed 10 by filtering out those very high boiling components which irreversible stick to carbon and lead to deactivation of the bed. The granular carbon prebed is highly porous being formed from large granular coconut carbon particles 19 which are approximately 1.5 mm in size. The granular coconut carbon prebed represents the bulk of the carbon in the entire filter 12 and it provides for the life of the filter 12.

The wicking fiber activated carbon bed, formed from the very small carbon particles 18 impregnated in the fiber filter mat 10, is the workhorse carbon bed despite its low levels of activated carbon. The fiber filter mat 10 is composed of highly effective finely powdered carbon particles 18 which are approximately 3 microns in size and entrapped without a binder within the wicking fiber channels 22. This is the kinetically robust zone that effectively removes rapid rise odors to below their odor threshold, through effective peak trimming. The small particles 18 of carbon provide an extremely high external surface area which can efficiently remove gases and also be regenerated efficiently.

A thin chemisorptive layer is formed on the backside of filter 12. Within this zone chemical reagents are dispersed in the channels of the outermost layer of the wicking fibers 20 in the fiber filter mat 10. These chemical reagents are used to remove difficult to remove gases such as $SO_2$ and $H_2S$.

Below is a data table, based on a pleaded configuration with a four fold use of filter media 10 in a ten inch by ten inch filter 12.

|  | Carbon Prebed zone (1) | Wicking Fiber Carbon Bed zone (2) | Chemisorptive Layer zone (3) |
| --- | --- | --- | --- |
| Carbon Content | 77.6 g 1.5 mm dia. | 4.0 g 3 microns | None |
| Internal Surface Area (BET) | 93,000 m$^2$ | 4,800 m$^2$ | None |
| External Surface Area | 2,280 cm$^2$ | 243,000 cm$^2$ | None |

Figure 3:
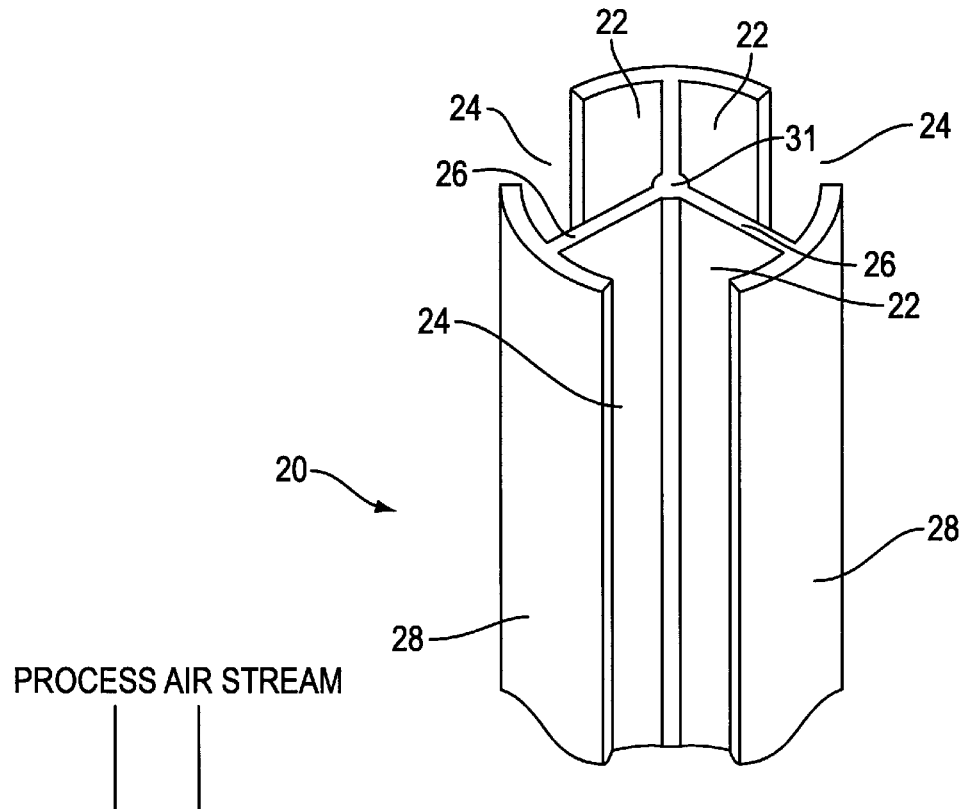
FIG. 3 is a perspective view showing a wicking fiber which is suitable for practicing the present invention.

A generally hollow fiber 20 which is suitable for practicing this invention is disclosed in U.S. Pat. No. 5,057,368 and is shown in FIG. 3. This patent discloses a trilobal or quadrilobal fiber formed from thermoplastic polymers wherein the fiber has a cross-section with a central core and three or four T-shaped lobes 26. The legs of the lobes intersect at the core 31 so that the angle between the legs of adjacent lobes is from about 80 degrees to 130 degrees. The thermoplastic polymer is typically a polyamide, a polyester, a polyolefin or a combination thereof. The fiber 20 as illustrated in FIG. 3 is formed as an extruded strand having three hollow interior longitudinally extending cavities 22 each of which communicates with the outer strand surface by way of longitudinal extending slots 24 which are defined between the outer ends of the T-shaped lobes.

As can be clearly seen in FIGS. 1 and 2 the active carbon particles 18 are retained within the individual cavities 22 without spilling out into the inter fiber voids. The fibers 20 strongly retain the active carbon particles 18 within the cavities 22 so that the particles 18 will not shake off and the fiber mat 10 retains the particles 18 when touched or handled. In a filter mat 10 of such fibers 20 the area between the individual strands remains relatively free of the gas adsorbing active carbon particles 18 with which the internal cavities 22 of each fiber 20 are filled. The filter mat 10 fibers 20 may be made of one or more types of material such as polyamides, polyesters, or polyolefins. The three T-shaped cross-section segments 26 may have their outer surface 28 curved, as shown, or the outer surface may also be straight. While the fiber 20 is depicted as three lobed other number of lobes are suitable. In addition other internal cavity fibers with C-shapes or other cross sections may also be suitable for retaining the small gas adsorbing particles 18 provided the opening from the cavity is sized to retain the particles 18 within the fiber interior.

In forming the fiber mat 10, the solid particles are aggressively rubbed into the fibers 20. The procedure used for dry impregnation is to take the fibers 20 and liberally dust them with the adsorbent powder. The particles 18 of the adsorbent powder have a diameter of less the one half the fiber 20 cross sectional diameter. The powder particles 18 are rolled into the fiber 20 several times. The excess powder is physically removed by agitation aided by a strong air flow. The powder particles 18 which remain within the cavities 22 are surprisingly stable and resistant to physical action. We believe it is a keystone type mechanical entrapment effect which so tenaciously hold the particles 18 within the fibers 20. The particles 18 seem to engage one another and do not spill from the cavities 22 through opening 24. We tried impregnating trilobal fiber in which the outer ends or caps of the lobes 26 were removed. Very little carbon particles were retained by such fibers.

In order to determine the cause of the forces responsible for this surprisingly strong interaction between the fibers 20 and the fine powder particles 18 we attempted to reduce the electrostatic bonding forces, if any, which might have caused this tenacious agglomeration. We first subjected the impregnated carbon fibers to 100% relative humidity and directed 40 meters per minute of air over the fibers 20 and collected any off dust. We found undetectable amounts. We further took the fiber filter mat 10 and submerged it into room temperature water with agitation and found the carbon particles 18 still remained securely in place. Then we took the filter fiber mat 10 and added detergent to the water with agitation and found no further loss. Additionally the carbon impregnated fibers 20 withstood both an alcohol and acetone wash without loss of carbon particles 18. These tests clearly indicate that the forces responsible for this interaction are non electrostatic in nature and suggest a mechanical entrapment. These tests also indicate the fibers 20, impregnated with activated carbon or other particles, might have applications for various fluid media including gas and liquids.

The disclosed approach can be extended to any powder which one would like to entrap within a fiber medium, including such agents as zeolites, baking soda, cyclodextrins or any number of other solid particle of interest. The fibers 20 have also been used to entrap particles of zinc oxide, zirconium oxide, silica, alumina in various phases, clays including kaolin and bentonite. In the fibers 20 shown in FIGS. 1 and 2 the fiber diameter is around 30 microns. The size of the cavity 22 opening 24 is approximately 10 microns. The carbon particles 18 are around 3 microns across and smaller.

The goal of any odor control filter is to be able to efficiently remove a wide class of odors to below odor threshold levels and within the pressure drop limitations of the particular application. Most prior art filters which rely on a simple singular type of adsorbent can not accomplish this. In order to accomplish this they need to use very large beds which generally exceeds the pressure drop specification. In our invention we configure and support a number of different adsorbent/absorbent zones via wicking fiber mat 20 to obtain a filter which is kinetically very efficient and has a long life for a broad range of odors. The zones are: (a) a large particle 19 granular carbon layer glued onto the front side of the wicking fiber mat 20, (b) the wicking fiber media 20 impregnated with finely ground powder 18, and (c) a chemical impregnate sprayed onto the backside of the wicking fiber media 20 which only penetrates a short distance into the media 20. The disclosed filter 12 of a multi component odor removal filter has the combined benefits of high kinetics efficiency and long life for a large number of gases.

The method of operation and the apparatus of this invention should now be clear. Undesirable air borne odor contaminants are removed from an air stream by interposing a plurality of at least partially hollow wicking fibers 20 in the air stream. The hollow portions 22 of the wicking fiber mat 10 contain a fine carbon powder with large carbon particles 19 disposed on one side of the mat 10 and a chemisorptive liquid disposed on a shallow layer on the other side of the mat 10. The zones formed in filter 12 including component having an affinity for the undesirable odor molecules in the air stream. The undesirable odor molecules are absorbed or adsorbed by the fine carbon powder and chemisorptive liquid within the wicking fibers 20.

The wicking fiber approach of the present invention has significant advantages over the straight use of dry activated carbon as disclosed in the prior art. The impregnated wicking fibers 20 can have an extremely high odor absorbing capacity, many times greater than that of large activated carbon particles. The pressure drop across an air filter 12 is much smaller than the drop across a prior art activated carbon filter for the same capacity and removal efficiency. The wicking fiber filter 10 can be impregnated with additional additives to the basic chemical reagent liquid package to remove a broader range of gases than activated carbon. The fine carbon powder 18 and the chemisorptive odor absorbing liquid can also include specialized additives such as transition metal salts and other agents such as sodium iodide for additional and broader odor removal coverage.

The present invention is particularly suited to cabin air odor filtration. The disclosed invention provides a compact, economical air filter 30 for the nonmechanical, noncyclic, continuous removal of odor causing gas molecules which avoids the problems of reduced air flow rates and decreased molecule removal efficiency.

We claim:

1. A filter using a fiber mat for removal of molecules from a fluid stream comprising:
   a plurality of elongated fibers, each having a longitudinally extending internal cavity including an opening from the internal cavity to the outer fiber surface, disposed to form the fiber mat;
   a fine powder, having an affinity for molecules to be removed from the fluid stream, made from particles which are smaller than the opening disposed and retained within the internal cavities of said plurality of elongated fibers;
   a plurality of large carbon particles attached to one side of the fiber mat; and,
   a liquid chemisorptive agent, having an affinity for molecules to be removed from the fluid stream, disposed to a shallow depth on the other side of the fiber mat.

2. A filter as claimed in claim 1 wherein each elongated fiber is less than 250 microns in diameter and the majority of fine powder particles are less than 20 microns in size.

3. A filter as claimed in claim 1 wherein said fine powder comprises carbon or zeolites.

4. A filter as claimed in claim 1 wherein a plurality of internal cavities, each including an opening to the outer fiber surface, are formed in each fiber.

5. A filter as claimed in claim 1 wherein the diameter of said elongated fibers is less than 250 microns, the width of said elongated opening is less than one half the strand diameter and the average diameter of said plurality of solid particles is less than 10 microns.

6. A filter as claimed in claim 1 wherein said liquid chemisorptive agent comprises Group 1 or Group 2 hydroxide, carbonates, phosphates, borates, pyrophosphates, and Group 6 to 12 metal halides, acetates, phosphates, nitrates, or Group 1 permanganate.

7. A filter formed from a shaped fiber mat comprising:
   a plurality of elongated fibers, forming the shaped fiber mat, each having a longitudinally extending internal cavity including an opening from the internal cavity to the outer fiber surface;
   a fine powder made from particles which are smaller than the opening disposed within the internal cavities of said plurality of elongated fibers;
   carbon particles which are much larger than the opening attached to one side of the shaped fiber mat; and,
   a liquid chemisorptive reagent disposed in a thin layer on the other side of the shaped fiber mat.

8. A filter as claimed in claim 7 wherein the fine powder particles are activated carbon or zeolites.

9. A filter as claimed in claim 7 wherein a plurality of internal cavities, each including an opening to the outer fiber surface, are formed in each fiber.

10. A filter as claimed in claim 7 wherein said liquid chemisorptive reagent comprises Group 6–12 metal acetates alkali combinations.

11. A filter as claimed in claim 10 wherein said liquid chemisorptive reagent comprises zinc acetate-potassium hydroxide.

12. A filter for removing odor molecules from an air stream comprising:
   a plurality of elongated fibers, each having an elongated open channel extending into the interior of the fiber, disposed to form a fiber filter mat;
   a fine powder, which has an affinity for selected types of odor molecules to be removed from the air stream, disposed and retained without an adhesive within the elongated open channels of said plurality of elongated fibers for adsorbing selected types of odor molecules as the air stream passes through the filter; and,
   a liquid chemisorptive agent, which has an affinity for selected types of odor molecules to be removed from the air stream, disposed to a shallow depth on one side of the fiber filter mat within the elongated open channels and having an exposed portion near the exteriors of the fibers for absorbing selected types of odor molecules as the air stream passes through the filter.

13. A filter as claimed in claim 12 comprising a plurality of carbon or zeolite particles, larger than the diameter of the fibers, attached to the other side of the fiber mat.

14. A filter as claimed in claim 12 wherein the fine powder particles are activated carbon or zeolites.

15. A filter as claimed in claim 12 wherein a plurality of internal cavities, each including an opening to the outer fiber surface, are formed in each fiber.

16. A device for continuously removing undesirable odor vapors from an air stream comprising:
   a plurality of wicking fibers, disposed to form a fiber mat, with each wicking fiber including a longitudinally extending channel with a longitudinally extending opening;
   a fine powder having an affinity for the undesirable odor vapors disposed within the longitudinally extending channels of said plurality of wicking fibers;
   a liquid chemisorptive agent having an affinity for the undesirable odor vapors disposed to a shallow depth on one side of said fiber mat within the longitudinally extending channels of said plurality of wicking fibers;
   means for directing the air stream across a part of said plurality of wicking fibers into contact with said fine powder and said liquid chemisorptive agent along said longitudinally extending openings whereby said fine powder and said liquid chemisorptive agent adsorb or absorb the undesirable odor vapors.

17. A device for continuously removing undesirable odor vapors as claimed in claim 16 comprising carbon particles, larger than said wicking fibers diameters, attached to the other side of said fiber mat.

18. A device for continuously removing undesirable odor vapors as claimed in claim 16 wherein a plurality of internal cavities, each including an opening to the outer fiber surface, are formed in each fiber.

19. A device for continuously removing undesirable odor vapors as claimed in claim 16 wherein said liquid chemisorptive agent comprises Group 1 metal permanganate in combination with either Group 1 metal carbonate or phosphate.

20. A filter for removing odor molecules comprising:
   a plurality of elongated flexible fibers, each having an elongated open channel extending into the interior of the fiber, disposed to form a nonwoven fiber filter mat;

a plurality of small solid particles which have an affinity for odor molecules disposed and permanently retained by mechanical interaction within the channels for adsorbing some odor gas molecules as they pass through the filter; and, a plurality of larger carbon particles which are larger than the diameter of the fibers attached to one side of the nonwoven fiber filter mat.

21. A filter for removing odor molecules as claimed in claim 20 comprising a liquid chemisorptive agent which has an affinity for selected types of odor molecules to be removed disposed to a shallow depth on the other side of the fiber filter mat within the elongated open channels for absorbing selected types of odor molecules.

22. A method of manufacturing for a filter a fiber mat formed from strands impregnated with solid particles comprising the steps of:

a. forming a fiber mat from strands with each strand having an internal longitudinally extending cavity having a longitudinally extending opening, smaller than the cavity width, extending from the cavity to the fiber strand outser surface;

b. applying a plurality of solid particles to the fiber mat;

c. forcing many of the solid particles into the internal longitudinally extending cavities of the strands where they are securely retained without an adhesive; and d. applying a liquid chemisorptive agent on one side of the fiber mat whereby the liquid chemisorptive agent is by capillary action drawn into at least some of the longitudinally extending cavities.

23. A method as claimed in claim 22 of manufacturing for a filter a fiber mat formed from strands impregnated with solid particles wherein the plurality of solid particles in step b are applied to one side of the fiber mat, and further comprising the additional step of:

e. attaching a plurality of carbon particles which are larger than the strands to the other side of the fiber mat.

\* \* \* \* \*